United States Patent
Rendo et al.

(10) Patent No.: US 9,422,868 B2
(45) Date of Patent: Aug. 23, 2016

(54) SIMPLE CYCLE GAS TURBOMACHINE SYSTEM HAVING A FUEL CONDITIONING SYSTEM

(71) Applicant: General Electric Company, Schenectady, NY (US)

(72) Inventors: Korey Frederic Rendo, Greer, SC (US); David Wesley Ball, Jr., Easley, SC (US); Diego Fernando Rancruel, Greenville, SC (US); Ameya Chandrakant Joshi, Greenville, SC (US); Michael Brian Smith, Simpsonville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 204 days.

(21) Appl. No.: 13/859,388

(22) Filed: Apr. 9, 2013

(65) Prior Publication Data

US 2014/0298816 A1    Oct. 9, 2014

(51) Int. Cl.
F02C 7/224    (2006.01)

(52) U.S. Cl.
CPC ...................................... *F02C 7/224* (2013.01)

(58) Field of Classification Search
CPC .............. F02C 3/34; F02C 7/224; F02C 3/30; F02C 3/305
USPC ................................................. 60/736, 39.52
See application file for complete search history.

(56) References Cited

U.S. PATENT DOCUMENTS

| | | | |
|---|---|---|---|
| 4,912,928 A | 4/1990 | Kaneko et al. | |
| 5,054,279 A * | 10/1991 | Hines .............................. | 60/39.5 |
| 5,632,143 A | 5/1997 | Fisher et al. | |
| 5,799,490 A | 9/1998 | Bronicki et al. | |
| 5,845,481 A | 12/1998 | Briesch et al. | |
| 6,089,024 A | 7/2000 | Hatanaka | |
| 6,389,794 B2 | 5/2002 | Ranasinghe et al. | |
| 6,622,470 B2 * | 9/2003 | Viteri et al. .................. | 60/39.52 |
| 6,637,183 B2 * | 10/2003 | Viteri et al. ................ | 60/39.182 |
| 6,913,068 B2 | 7/2005 | Togawa et al. | |
| 8,015,793 B2 | 9/2011 | Austin et al. | |
| 8,056,318 B2 * | 11/2011 | Chillar ...................... | F02C 3/34 60/278 |
| 8,534,073 B2 * | 9/2013 | Garcia-Crespo et al. ....... | 60/772 |
| 8,567,177 B1 * | 10/2013 | Drori et al. ..................... | 60/39.5 |
| 8,677,729 B2 * | 3/2014 | Bilton et al. ................... | 60/39.5 |
| 2005/0172635 A1 * | 8/2005 | Carlson et al. ................. | 60/775 |
| 2006/0032228 A1 * | 2/2006 | Marin et al. .................... | 60/730 |
| 2007/0095068 A1 * | 5/2007 | Joshi et al. ...................... | 60/772 |
| 2007/0214766 A1 * | 9/2007 | Obana et al. ................. | 60/39.15 |
| 2008/0309087 A1 * | 12/2008 | Evulet ...................... | F02C 3/34 290/52 |
| 2009/0229271 A1 | 9/2009 | De Ruyck et al. | |
| 2010/0300103 A1 * | 12/2010 | Roby et al. ...................... | 60/737 |
| 2012/0240590 A1 * | 9/2012 | Hellat ..................... | F01D 25/08 60/772 |
| 2013/0186097 A1 * | 7/2013 | Hains et al. .................... | 60/775 |

* cited by examiner

Primary Examiner — Carlos A Rivera

(74) Attorney, Agent, or Firm — Dority & Manning, PA

(57) ABSTRACT

A simple cycle gas turbomachine includes a compressor portion, and a turbine portion having an outlet. At least one combustor is fluidically connected to the compressor portion and the turbine portion. An exhaust member includes an inlet, fluidically connected to the outlet of the turbine portion, a first outlet and a second outlet. A fuel conditioning system includes a heat exchange member provided with a first circuit having an exhaust gas inlet fluidically connected to the second outlet of the exhaust member and an exhaust gas inlet, a second circuit having an inlet fluidically connected to a source of fuel and an outlet fluidically connected to the at least one combustor. A conditioned fluid conduit is fluidically connected between a source of conditioned fluid and one of the combustor assembly and the first outlet of the exhaust member.

10 Claims, 2 Drawing Sheets

SIMPLE CYCLE GAS TURBOMACHINE SYSTEM HAVING A FUEL CONDITIONING SYSTEM

BACKGROUND OF THE INVENTION

The subject matter disclosed herein relates to the art of simple cycle gas turbine systems and, more particularly, to a simple cycle gas turbine system including a fuel conditioning system.

Gas turbomachines include a compressor portion linked to a turbine portion through a common compressor/turbine shaft and a combustor assembly. An inlet airflow is passed through an air intake toward the compressor portion. In the compressor portion, the inlet airflow is compressed through a number of sequential stages toward the combustor assembly. In the combustor assembly, the compressed airflow mixes with a fuel to form a combustible mixture. The combustible mixture is combusted in the combustor assembly to form hot gases. The hot gases are guided to the turbine portion through a transition piece. The hot gases expand through the turbine portion acting upon turbine buckets mounted on wheels to create work that is output, for example, to power a generator, a pump, or to provide power to a vehicle.

BRIEF DESCRIPTION OF THE INVENTION

According to one aspect of an exemplary embodiment, a simple cycle gas turbomachine includes a compressor portion, and a turbine portion operatively connected to the compressor portion. The turbine portion includes an outlet. A combustor assembly includes at least one combustor fluidically connected to the compressor portion and the turbine portion. An exhaust member includes an inlet, fluidically connected to the outlet of the turbine portion, a first outlet and a second outlet. A fuel conditioning system includes a heat exchange member provided with a first circuit having an exhaust gas inlet fluidically connected to the second outlet of the exhaust member and an exhaust gas outlet, a second circuit having an inlet fluidically connected to a source of fuel and an outlet fluidically connected to the at least one combustor. The first circuit is in a heat exchange relationship with the second circuit. A conditioned fluid conduit is fluidically connected between a source of conditioned fluid and the one of the combustor assembly and the first outlet of the exhaust member.

According to another aspect of the exemplary embodiment, a method of conditioning fuel for a simple cycle gas turbomachine includes delivering exhaust gases from a turbine portion of the simple cycle gas turbomachine to an inlet of an exhaust member, passing a portion of the exhaust gases from the exhaust member downstream of the inlet into an exhaust gas inlet of a first circuit of a heat exchange member, passing a fuel through a second circuit of the heat exchange member, guiding the portion of the exhaust gases across the second circuit in a heat exchange relationship, passing the portion of the exhaust gases through an exhaust gas outlet of the heat exchange member, directing the fuel from the second circuit to a combustor fluidically connected to the turbine portion, and passing conditioned fluid to one of a combustor assembly and the exhaust gas inlet.

These and other advantages and features will become more apparent from the following description taken in conjunction with the drawings.

BRIEF DESCRIPTION OF DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
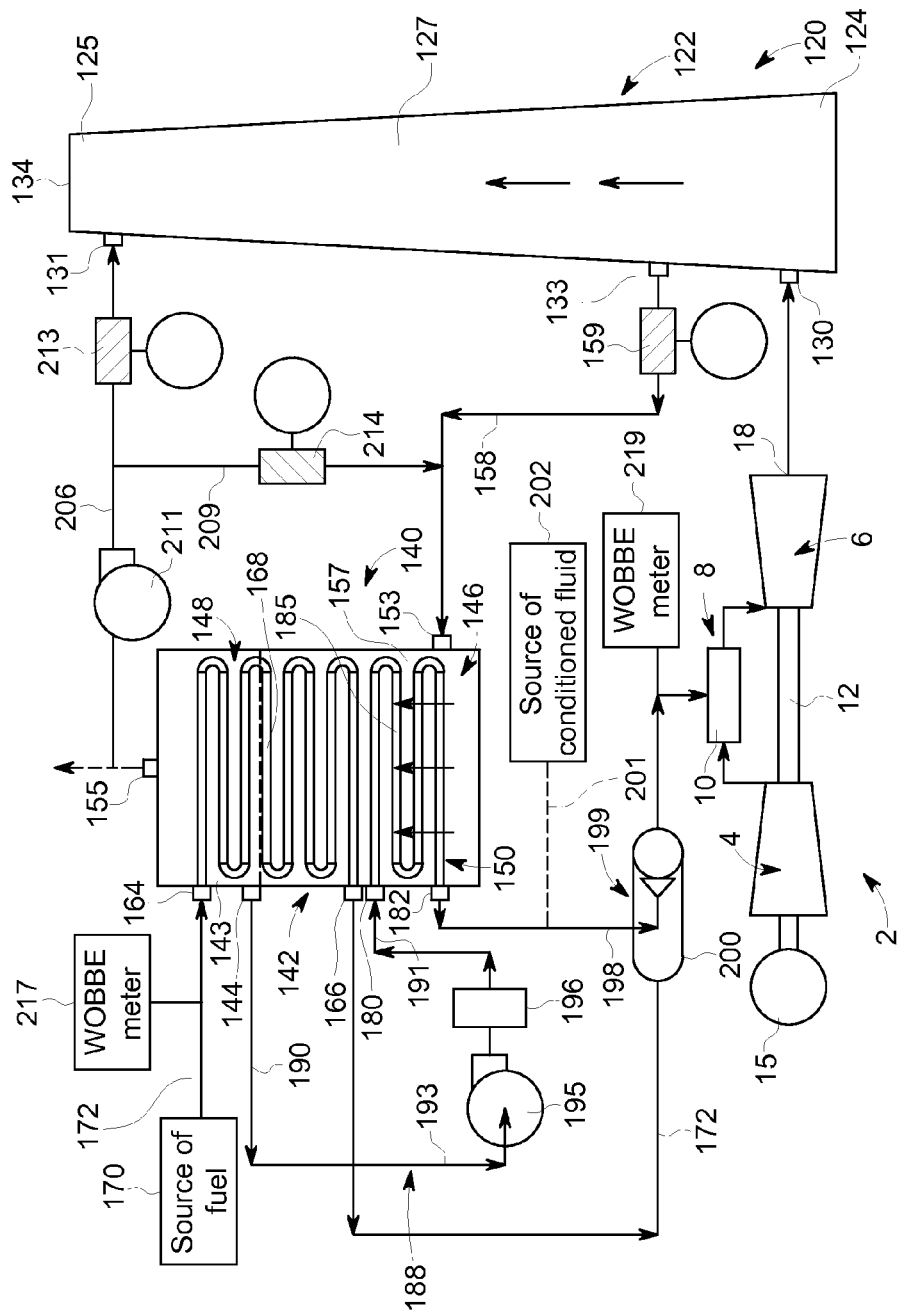
FIG. 1 is a schematic view of a simple cycle gas turbomachine including a fuel conditioning system in accordance with another aspect of an exemplary embodiment.

A simple cycle gas turbomachine in accordance with an exemplary embodiment is indicated generally at 2 in FIG. 1. Turbomachine 2 includes a compressor portion 4 operatively coupled to a turbine portion 6 through a combustor assembly 8. Combustor assembly 8 includes one or more combustors 10. Turbomachine 2 is also mechanically linked to turbine portion 6 through a common compressor/turbine shaft 12. A generator 15 is mechanically linked to compressor portion 4. Of course, it should be understood that the particular connection of generator 15 may vary and could include a connection to turbine portion 6.

In operation, air enters compressor portion 4 and is compressed through a number of sequential compressor stages forming compressed air. A portion of the compressed air is passed to combustor assembly 8 to mix with a fuel to form a combustible mixture. Another portion of the compressed air is passed into turbine portion 6 for cooling purposes. The combustible mixture is combusted in combustor 10 creating products of combustion that flow into turbine portion 6 through a transition piece (not shown). The products of combustion exit turbine portion 6 via an outlet 18 in the form of exhaust gases.

Outlet 18 of turbine portion 6 is fluidically connected to an exhaust member 120 that is shown in the form of an exhaust stack 122. Exhaust stack 122 extends from a first end 124 to a second end 125 through an intermediate portion 127. A first inlet 130 is provide proximate to first end 124 and a second inlet 131 is provided proximate to second end 125. The particular location of first and second inlets 130 and 131 may vary. Exhaust stack 122 also includes a first outlet 133 arranged downstream of first inlet 130 and upstream of second inlet 131. A second outlet 134 is provided at second end 125 downstream of second inlet 131. Second outlet 134 discharges to ambient. In order to reduce contaminants such as NOx in the exhaust gases, provide power augmentation and enhance efficiency in the form of heat recuperation, turbomachine 2 is coupled to a fuel conditioning system 140.

Fuel conditioning system 140 includes a heat exchange member 142 having a condensing section 143 provided with a condensate outlet element 144, a first circuit 146, a second circuit 148 and a third circuit 150. First circuit 146 includes an exhaust gas inlet 153 fluidically connected to first outlet 133 on exhaust stack 122. Exhaust gases entering first circuit 146 passes through exhaust gas inlet 153 and flow to an exhaust gas outlet 155 via an exhaust flow channel 157. Exhaust gases pass through an exhaust gas inlet conduit 158 controlled by a damper 159. Damper 159 cuts off flow to heat exchange member 142 when fuel conditioning is not desired. Second circuit 148 includes a fuel inlet 164 and a fuel outlet 166. Fuel entering fuel inlet 164 passes through a serpentine flow zone 168 arranged in a heat exchange relationship with exhaust gases flowing through exhaust flow channel 157. Fuel inlet 164 is fluidically connected to a source of fuel 170 via a fuel conduit 172.

Third circuit 150 includes a condensate inlet 180 a condensate outlet 182 and a serpentine flow zone 185. Condensate passes from condensing section 143 via a conditioned fluid or condensate conduit 188. Condensate conduit 188 extends from a first end section 190 to a second end section 191 through an intermediate section 193. A pump 195 and a condensate conditioning system 196 are fluidically connected to condensate conduit 188. In accordance with an aspect of the exemplary embodiment, condensate conditioning system 196 may take the form of a deionizer. Conditioned condensate flows through condensate inlet 180 and along serpentine flow section 185 in a heat exchange relationship with exhaust gases passing through exhaust flow channel 157. The condensate passes from condensate outlet 182 to combustor 10. More specifically, heated condensate passes through an outlet conduit 198 to a nozzle 199. Nozzle 199 may take the form of an attemporator, an eductor, or an ejector such as indicted at 200. In nozzle 199, the heated condensate mixes with heated fuel passing through fuel conduit 172 and is introduced into combustor 10. The introduction of conditioned fluid, in the form of conditioned condensate controls the exhaust gas temperature of the exhaust gases flowing through heat exchange member 142. More specifically, fuel conditioning system 140 reduces exhaust gas temperature to prevent the exhaust gases causing the combustible mixture to reach an auto-ignition temperature. It should be understood that while described as passing from condensing section 143, conditioned fluid can pass through a conditioned fluid conduit 201 that fluidically connected between a source of conditioned fluid 202 and outlet conduit 198. Further, it should be understood that in addition to providing conditioned fluid to combustor assembly 8, conditioned fluid may also be provided to compressor portion 4 and/or turbine portion 6.

In still further accordance with the exemplary embodiment, exhaust gas outlet 155 is fluidically connected to second inlet 131 of exhaust stack 122 via an exhaust gas outlet conduit 206. A portion of the exhaust gases passing from exhaust gas outlet 155 are passed into a conditioning branch 209 that is fluidically connected between exhaust gas outlet conduit 206 and exhaust gas inlet 153. A blower or fan 211 is connected to exhaust gas outlet conduit 206 upstream of conditioning branch 209. A damper 213 is provided in exhaust gas outlet conduit 206 downstream of conditioning branch 209. An additional damper 214 is provided in conditioning branch 209. Dampers 213 and 214 are selectively positioned to guide a portion of the cooler exhaust gases passing from exhaust gas outlet 155 back into hotter exhaust gases passing from exhaust stack 122 into exhaust gas inlet 153. The cooler and hotter exhaust gases mix to achieve a desired exhaust gas temperature along exhaust gas flow channel 157. The particular degree of opening of damper 213 and damper 214 may vary. In addition, first and second Wobbe meters 217 and 219 are arranged at fuel inlet 164 and combustor 10 to monitor combustion energy of the fuel.

Figure 2:
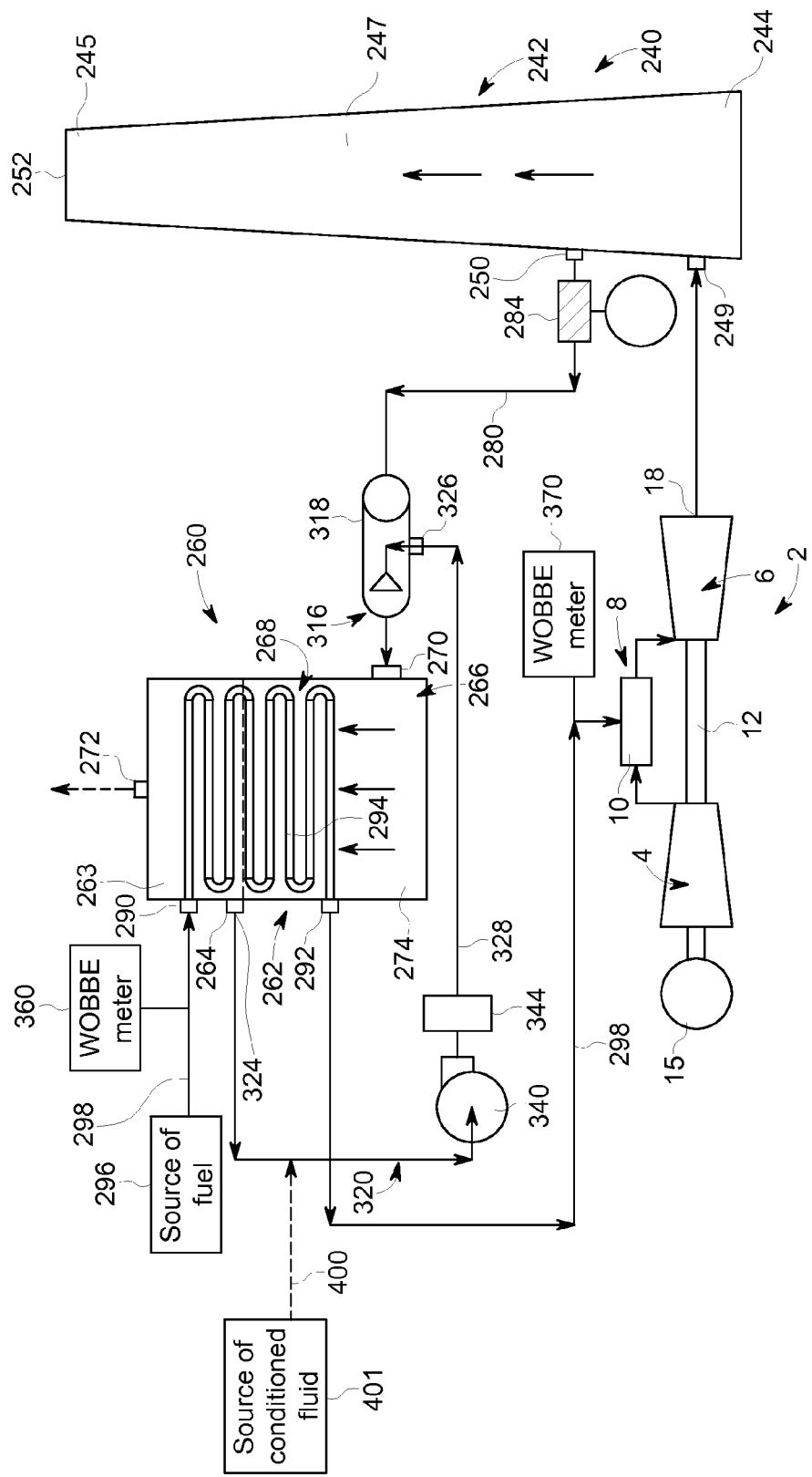
FIG. 2 is a schematic view of a simple cycle gas turbomachine including a fuel conditioning system in accordance with another aspect of an exemplary embodiment.

Reference will now be made to FIG. 2, wherein like reference numbers represent corresponding parts in the respective views. Outlet 18 of turbine portion 6 is fluidically connected to an exhaust member 240 that is shown in the form of an exhaust stack 242. Exhaust stack 242 extends from a first end 244 to a second end 245 through an intermediate portion 247. An inlet 249 is provided proximate to first end 244. Exhaust stack 242 also includes a first outlet 250 arranged downstream of inlet 249. A second outlet 252 is provided at second end 245 downstream of first outlet 250. Second outlet 252 discharges to ambient. In order to reduce contaminants such as NOx in the exhaust gases, provide power augmentation and enhance efficiency in the form of heat recuperation, turbomachine 2 is coupled to a fuel conditioning system 260.

Fuel conditioning system 260 includes a heat exchange member 262 having a condensing section 263 provided with a condensate outlet element 264, a first circuit 266 and a second circuit 268. First circuit 266 includes an exhaust gas inlet 270 fluidically connected to first outlet 250 on exhaust stack 242. Exhaust gases entering first circuit 266 pass through exhaust gas inlet 270 and flow to an exhaust gas outlet 272 via an exhaust flow channel 274. Exhaust gases enter exhaust gas inlet via an exhaust gas inlet conduit 280 controlled by a damper 284. Damper 284 cuts off flow to heat exchange member 262 when fuel conditioning is not desired. Second circuit 268 includes a fuel inlet 290 and a fuel outlet 292. Fuel entering fuel inlet 290 passes through a serpentine flow zone 294 arranged in a heat exchange relationship with exhaust gases flowing through exhaust flow channel 274. Fuel inlet 290 is fluidically connected to a source of fuel 296 via a fuel conduit 298. In a manner similar to that described above, fuel conditioning system 260 controls exhaust gas temperature of the exhaust gases flowing through heat exchange member 262. More specifically, fuel conditioning system 260 reduces exhaust gas temperature to prevent the exhaust gases causing the combustible mixture to reach an auto-ignition temperature.

Exhaust gases passing from exhaust gas outlet 250 pass through a nozzle 316. Nozzle 316 may take the form of an attemporator, an educator, or an ejector such as indicated at 318. Condensate is mixed with the exhaust gases at nozzle 316. More specifically, a conditioned fluid or condensate conduit 320 extends from a first end section 324, fluidically connected condensate outlet element 264, to a second end section 326 through an intermediate section 328. Second end section 326 is fluidically connected to nozzle 316. A pump 340 is fluidically connected in intermediate section 328 upstream of a condensate conditioning system 344. Condensate conditioning system 344 may take the form of a deionizer. In this manner, fuel conditioning system 260 delivers conditioned condensate into the hot exhaust gases flowing into heat exchange member 262. The addition of conditioned fluid in the form of conditioned condensate decreases exhaust gas temperature below an auto-ignition temperature of the combustible fluids passing through heat exchange member 262. More specifically, the addition of condensate reduces flammability limits of a natural gas, gas turbine exhaust gas, and diluent ($H_2O$) mixture. In a manner similar to that described above, first and second Wobbe meters 360 and 370 are arranged at fuel inlet 290 and combustor 10 to monitor combustion energy of the fuel. It should be understood that while described as passing from condensing section 263, conditioned fluid can be provided through a conditioned fluid conduit 400 fluidically connected between a source of conditioned fluid 401 and condensate conduit 320. Conditioned fluid may also be passed to compressor portion 4 and/or turbine portion 6.

One of ordinary skill in the art would recognize that controlling exhaust gas temperature of exhaust gases flowing along exhaust flow channel 68 maintains a temperature in the heat exchange member below the auto-ignition temperature of the combustible mixture passing the combustor assembly, reducing operational risk and hazards associated with heating fuel in the presence of mediums containing oxygen. In addition, reclaiming heat in the exhaust gases increases turbomachine efficiency. The exemplary embodiments may also maintain fuel temperature below thermal decomposition temperature. Exemplary embodiments may also contribute a motive force for the heating medium that is in direct heat exchange with the fuel. The exemplary embodiment may also maintain back-pressure of the gas turbine, thus maintaining performance requirements for operation. Further, it should be understood that while shown as employing an attemporator, and eductor, or an ejector to introduce condensate into exhaust gases, other systems may also be employed for condensate introduction and/or mixing. It should also be understood that conditioned fluid includes fluid that is both conditioned to a desired temperature and fluid that has been molecularly and/or chemically altered.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A simple cycle gas turbomachine, comprising:
   a compressor portion;
   a turbine portion operatively connected to the compressor portion, the turbine portion including a turbine outlet;
   a combustor assembly including at least one combustor fluidically connected to the compressor portion and the turbine portion;
   an exhaust member comprising an exhaust member inlet fluidically connected to the turbine outlet, a first outlet, and a second outlet defining a discharge to ambient; and
   a fuel conditioning system comprising a heat exchange member including a first conduit comprising an exhaust gas inlet fluidically connected to the first outlet of the exhaust member and an exhaust gas outlet, a second conduit comprising a fuel inlet fluidically connected to a source of fuel and a fuel outlet fluidically connected to the at least one combustor, and a third conduit comprising a condensate inlet fluidically connected to the first conduit and a condensate outlet fluidically connected to the combustor assembly, the first conduit being in a heat exchange relationship with the second conduit and the third conduit, wherein exhaust gases entering the exhaust gas inlet of the first conduit flow past the third conduit before flowing past the second conduit; and
   a conditioned fluid conduit fluidically connected between a source of conditioned fluid and the combustor assembly.

2. The simple cycle gas turbomachine according to claim 1, further comprising a conditioning branch selectively fluidically connected between the exhaust gas outlet of the heat exchange member and the exhaust gas inlet.

3. The simple cycle gas turbomachine according to claim 1, wherein the conditioned fluid conduit is fluidically connected to the at least one combustor through one of an attemporator, an eductor and an ejector.

4. The simple cycle gas turbomachine according to claim 1, further comprising:
   at least one of a deionizer and a pump fluidically connected in the third conduit.

5. A method of conditioning fuel for a simple cycle gas turbomachine, the method comprising:
   delivering exhaust gases from a turbine portion of the simple cycle gas turbomachine to an inlet of an exhaust member;
   passing a portion of the exhaust gases from the exhaust member downstream of the inlet into an exhaust gas inlet of a first conduit of a heat exchange member;
   passing condensate extracted from the exhaust gases through a third conduit of the heat exchange member;
   passing a fuel through a second conduit of the heat exchange member;
   guiding the portion of the exhaust gases across the second conduit and the third conduit in a heat exchange relationship, wherein the portion of the exhaust gases entering the exhaust gas inlet of the first conduit flows across the third conduit before flowing across the second conduit;
   passing the portion of the exhaust gases through an exhaust gas outlet of the heat exchange member;
   directing the fuel from the second conduit to a combustor fluidically connected to the turbine portion; and
   passing conditioned fluid to one of the combustor and the exhaust gas inlet.

6. The method of claim 5, further comprising:
   delivering a portion of the portion of exhaust gases passing from the exhaust gas outlet to the exhaust gas inlet to establish a desired temperature of the portion of the exhaust gases flowing through the first conduit.

7. The method of claim 5 further comprising:
   passing the condensate from the third conduit to the combustor.

8. The method of claim 5, further comprising:
   conditioning the condensate passing into the third conduit.

9. The method of claim 5 further comprising:
   passing the condensate from the third conduit to the combustor through one of an attemporator, an eductor and an ejector.

10. The method of claim 5, further comprising:
    conditioning the condensate passing through the heat exchange member.

* * * * *